(12) United States Patent
Huang

(10) Patent No.: US 7,697,056 B2
(45) Date of Patent: Apr. 13, 2010

(54) DIGITAL CAMERA MODULE AND METHOD FOR ASSEMBLING THE SAME

(75) Inventor: Shih-Lung Huang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 318 days.

(21) Appl. No.: 11/687,114

(22) Filed: Mar. 16, 2007

(65) Prior Publication Data
US 2008/0122967 A1 May 29, 2008

(30) Foreign Application Priority Data
Nov. 27, 2006 (TW) .............................. 95143816 A

(51) Int. Cl.
*H04N 5/225* (2006.01)
(52) U.S. Cl. .................. 348/340; 348/335; 348/336; 348/337; 348/338; 348/339; 348/373; 348/374; 348/375; 348/376
(58) Field of Classification Search ........... 348/340, 348/373, 374
See application file for complete search history.

(56) References Cited
U.S. PATENT DOCUMENTS

| | | | |
|---|---|---|---|
| 2006/0228099 A1* | 10/2006 | Chiang | 396/133 |
| 2007/0077050 A1* | 4/2007 | Yu | 396/133 |
| 2007/0097527 A1* | 5/2007 | Ichikawa et al. | 359/819 |

* cited by examiner

*Primary Examiner*—Jason Chan
*Assistant Examiner*—Yih-Sien Kao
(74) *Attorney, Agent, or Firm*—Zhigang Ma

(57) ABSTRACT

An exemplary digital camera module (200) includes a lens module (20), a chip package (30) and a focusing structure (40). The lens module includes a holder (24) and a barrel slidably received in the holder. At least one lens element (222) is fixed in the barrel. The holder has several channels (246) defined therein. Each channel respectively has an enlarged end opening (2468) and receives a corresponding wire (28) therein. The focusing structure is attached to the holder. Several pads (36) are formed on the surface of the chip package. Each wire electrically connects with a given pad using a conductive adhesive (52), and, via such a connection, the chip package is able to control the focusing structure to drive movement of the barrel. The respective enlarged end openings serve to help retain the corresponding conductive adhesive proximate/adjacent a given pad.

15 Claims, 8 Drawing Sheets

DIGITAL CAMERA MODULE AND METHOD FOR ASSEMBLING THE SAME

BACKGROUND OF THE INVENTION

1. Field of the Invention

The present invention relates to digital camera modules and, particularly, to a digital camera module with an automatic focusing structure and a method for assembling the same.

2. Description of Related Art

Digital camera modules are widely used in portable electronic devices such as mobile phones, and personal digital assistants (PDAs). In order to attain a better image quality, many digital cameras have an automatic focusing structure. The focusing structure can be used for adjusting distance between the lens module and the image pickup device to make a clearer image when photographing objects at different distances from the camera.

Referring to FIGS. 7-8, a typical digital camera module 100 with an automatic focusing structure includes a lens module 12, a focusing structure 14, and a chip package 16. The lens module 12 includes a barrel 121 and a holder 122. The holder 122 has a through hole 1222 defined therein, so that light can be transmitted therethrough. Several lens elements 123 are fixed in the barrel 121, and the barrel 121 is slidably received in the through hole 1222. A plurality of channels 124 is defined in the holder 122. Each channel 124 has a first end opening 1242 and an opposite second end opening 1244. The first end opening 1242 communicates with the through hole 1222. The second end opening 1244 communicates with the bottom outside of the lens module 12. Each channel 124 receives a wire 125, and the wire 125 extends out from the two end openings 1242, 1244 of a corresponding channel 124. The focusing structure 14 is fixed in the holder 122, so as to seal the first end opening 1242 of the channel 124 and electrically connect with the wires 125. The focusing structure 14 connects with the barrel 121 so as to drive the barrel 121 to move up and down. The chip package 16 includes a chip module 162 and a base 164. The chip module 162 is mounted on a central area of the base 164. A plurality of pads 166 is mounted on the periphery of the base 164, electrically connecting with the chip module 162.

In assembly of the lens module 12 to the base 164, some conductive adhesive 18 is dropped on the pads 166 of the base 164. The second end openings 1244 of the channels 124 correspond to the pads 166, respectively. The lens module 12 is placed on the base 164 and bonds with the base 164 when the conductive adhesive 18 becomes solidified. At the same time, the wire 125 electrically connects with a corresponding pad 166 by means of the conductive adhesive 18. Accordingly, the chip module 162 may control the focusing structure 14 to adjust the distance between the chip module 162 and the lens elements 123 to attain a clearer image when photographing objects at different distances from the camera module 100.

Generally, the channels 124 are thin and the second end openings 1244 are narrow, so that it is difficult for the liquid conductive adhesive 18 to completely flow into the channels 124 via a corresponding second end opening 1244. Therefore, the liquid conductive adhesive 18 might overflow from the channels 124 and touch the outside during assembly, and, as such, the appearance of the digital camera module 100 might be affected. In addition, the signals from the chip module 162 to the focusing structure 14 might be distorted from the outside via the overflowed conductive adhesive 18. Accordingly, the ability to adequately adjust the displacement of the chip module 162 relative to the focusing structure 14 might be adversely affected. Furthermore, some liquid conductive adhesive 18 is pressed into the channels 124 during assembly. When the conductive adhesive 18 is solidified, the channels 124 are sealed with some air therein. The air in the channels 124 might expand when hot and contract when cold so as to create an unplanned/unaccounted source of variability within the combination of the elements of the digital camera module 100.

Therefore, a digital camera module and a method of assembling the same are desired in order to overcome the above-described problems.

SUMMARY OF THE INVENTION

One embodiment of an exemplary digital camera module includes a lens module, a focusing structure, and a chip package. The lens module includes a holder and a barrel slidably received in the holder. At least one lens element is fixed in the barrel. The holder has several channels defined therein. Each channel has an enlarged end opening and receives a wire. The focusing structure is attached to the holder. Several pads are formed on the surface of the chip package. The positions of the pads correspond to the enlarged end openings of the channels. An amount of conductive adhesive is deposited on the pads. The lens module is attached to the chip package by means of the conductive adhesive. Each wire electrically connects a corresponding pad, and the chip package is thereby configured (i.e., structured and arranged) for controlling the focusing structure to drive the barrel to move.

Other advantages and novel features will become more apparent from the following detailed description when taken in conjunction with the accompanying drawings.

BRIEF DESCRIPTION OF THE DRAWINGS

Many aspects of the present digital camera module with an automatic focusing structure can be better understood with reference to the following drawing. The components in the drawings are not necessarily drawn to scale, the emphasis instead being placed upon clearly illustrating the principles of the present digital camera module. Moreover, in the drawings, like reference numerals designate corresponding parts throughout the several views.

DETAILED DESCRIPTION OF THE INVENTION

Figure 1:
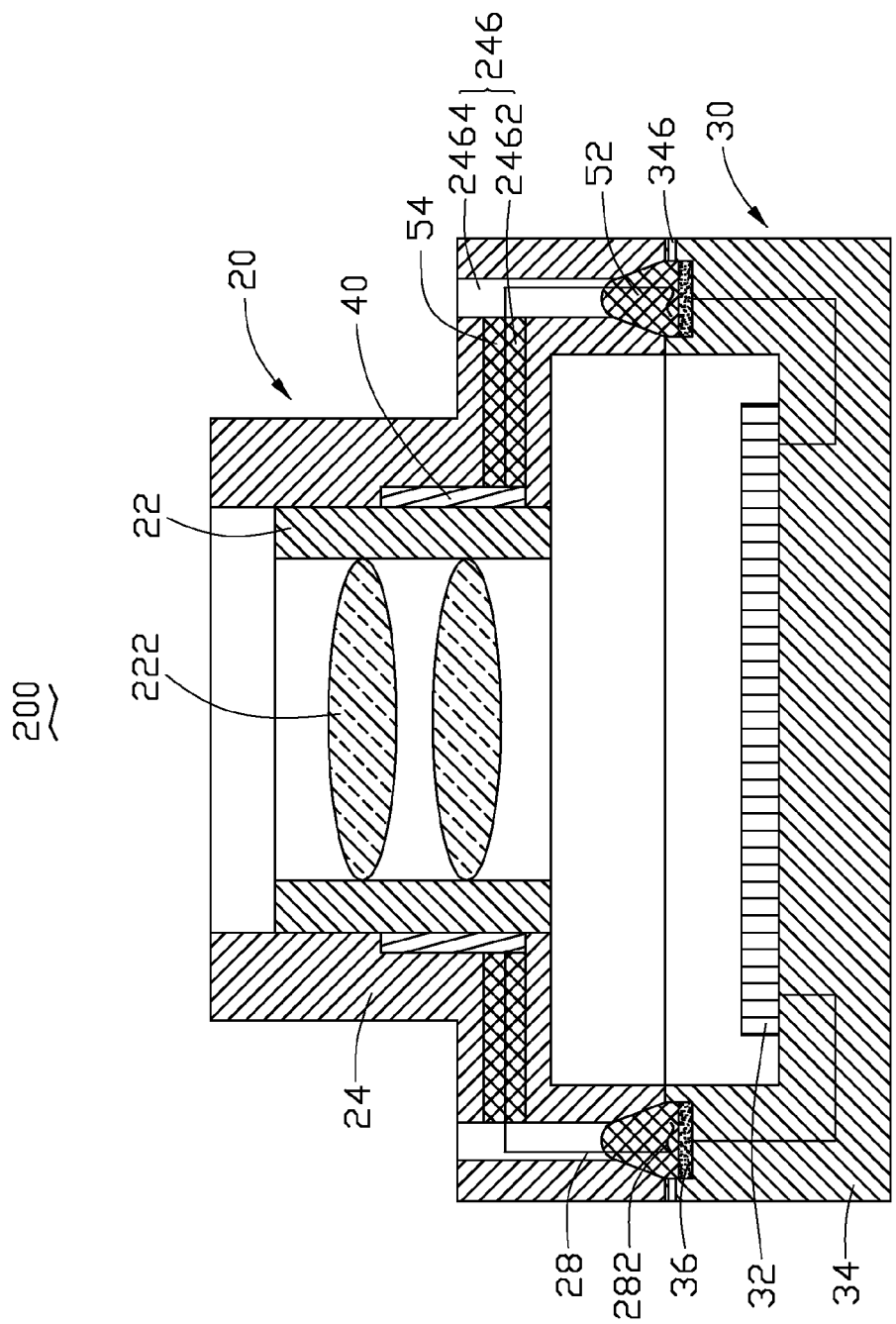
FIG. 1 is a cut-away view of a digital camera module with an automatic focusing structure, in accordance with one embodiment.

Referring now to the drawings, FIG. 1 shows a digital camera module 200, according to a preferred embodiment. The digital camera module 200 is adapted for using in a portable electronic device such as a mobile phone or a personal digital assistant (PDA). However, it is to be understood that the compact nature thereof could prove useful in compact digital camera units, digital camcorders, or video monitors, as well. The digital camera module 200 includes a lens module 20, a chip package 30, and a focusing structure 40.

Figure 2:
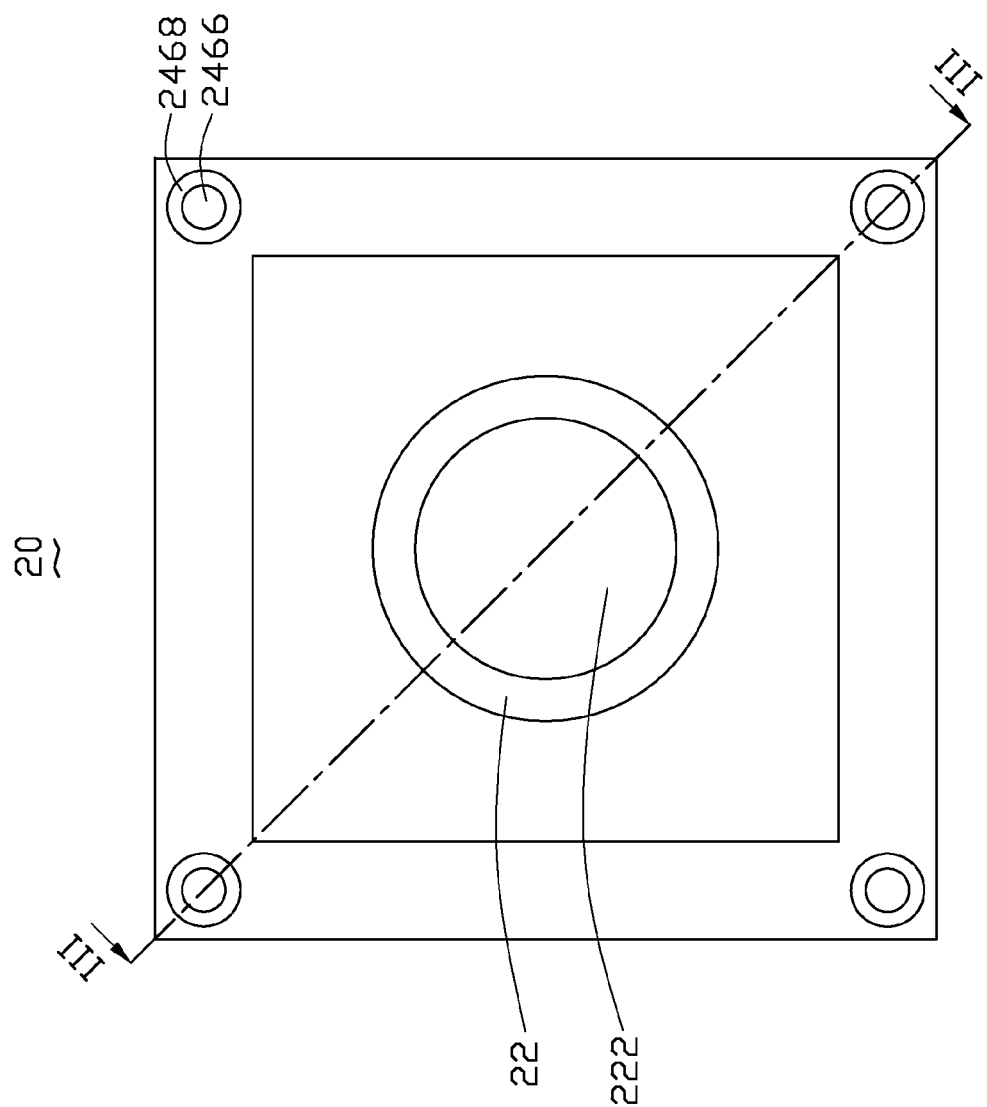
FIG. 2 is a bottom view of a lens module incorporating a focusing structure shown in FIG. 1.
Figure 3:
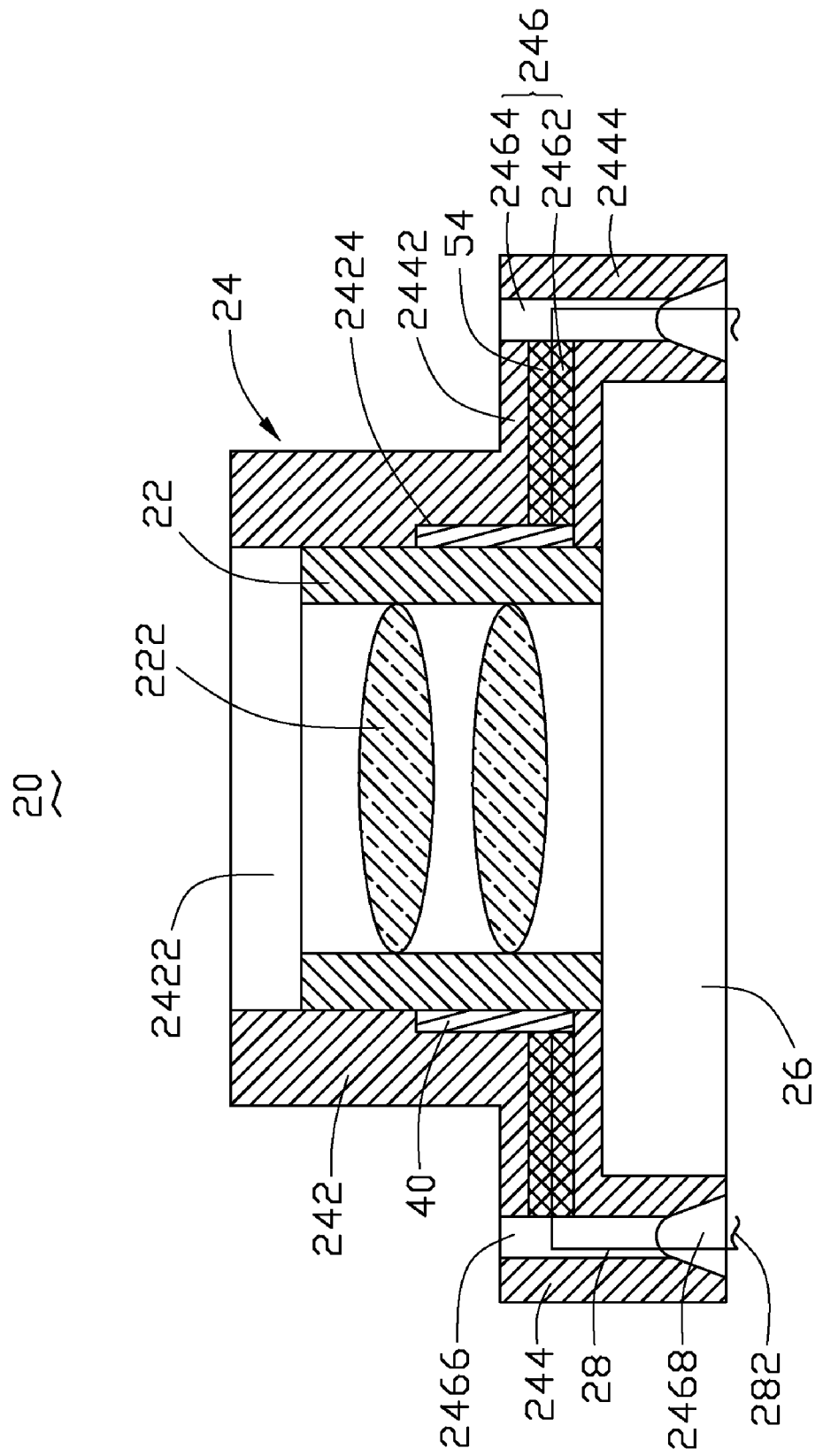
FIG. 3 is a cut-away view of a lens module incorporating a focusing structure, taken along the III-III line in FIG. 2.

Referring to FIGS. 2-3, the lens module 20 includes a barrel 22 and a holder 24. The barrel 22 is a substantially hollow cylinder with two open ends so that light can be transmitted therethrough. Several lens elements 222 are disposed in the barrel 22, which receive light beams that enter from the outside and which are able to selectably manipulate (e.g., focus) the light so that it will reach the chip package 30 in the desired manner.

The holder 24 includes a holder body 242 and a flange 244 formed at a rear end of the holder body 242. The holder body 242 is a cylinder and defines a through hole 2422 configured for slidably receiving the barrel 22. The flange 244 is a rectangular parallelogram, defining a rectangular cavity 26 in a middle area thereof opposite to the holder body 242. The flange 244 thus shaped includes a connecting board 2442 and four sidewalls 2444. The connecting board 2442 connects/links the sidewalls 2444 to the holder body 242. The connecting board 2442 may, for example, be integral with the sidewalls 2444 (e.g., co-molded) or attached thereto (e.g., metallurgically, such as by soldering or welding). In a similar fashion, the connecting board 2442 may be integral with or attached to the holder body 242. The rectangular cavity 26 communicates with the through hole 2422 of the holder body 242 so that light can be transmitted therethrough. An outer diameter of the holder body 242 is smaller than an edge of the flange 244 so that a step is formed at a connection therebetween. An edge of the rectangular cavity 26 is larger than an inner diameter of the through hole 2422.

Two spaced rectangular notches 2424 are defined on an inner peripheral wall of the through hole 2422, and such notches 2424 are configured for receiving the focusing structure 40. The two notches 2424 are symmetrically opposite each other. Several channels 246 are distinctly and spacedly defined in the holder 24 and are respectively configured for receiving a corresponding wire 28. Each channel 246 includes a horizontal hole 2462 (i.e., essentially parallel to a surface of the connecting board 2442) and a vertical hole 2464. The horizontal hole 2462 is positioned in the connecting board 2442 of the flange 244 and communicates with a given notch 2424. The vertical hole 2464 is defined in a corresponding sidewall 2444 and communicates with a corresponding horizontal hole 2462. Each vertical hole 2464 is parallel with an axis of the barrel 22 and extends through the sidewall 2444. The vertical hole 2464 has a cylindrical end opening 2466 and an enlarged end opening 2468. The enlarged end opening 2468 is horn-shaped and, more specifically, rounded-conical in shape, and the diameter of the enlarged end opening 2468 becomes bigger from the inside to the outside (i.e., bigger toward the portion thereof proximate/adjacent the chip package 30, in assembly).

The wires 28 are made of a conductive material, such as copper. Each respective wire 28 is received in a given horizontal hole 2462 and a corresponding vertical hole 2464. The wire 28 has a connecting end 282, which extends out from a corresponding enlarged end opening 2468 and is configured for connecting (i.e., mechanically bonding and electrically coupling) with a conductive adhesive 52. The connecting end 282 may, advantageously, be bent to be initially approximately perpendicular to the axis of the vertical hole 2464 and the remainder of the wire 28 so as to increase the area of the surface thereof so that more conductive adhesive 52 may be attached to the connecting end 282 (i.e., thereby increasing the effective bonding surface and, accordingly, joint strength). The connecting end 282 is itself, further advantageously, curved-shaped or hook-shaped or is compressed to be plate-shaped (such alternatives also increasing available bonding surface). In addition, the connecting end 282 may be in the form of a ball or a square body. Furthermore, the connecting end 282 may be circular.

Each connecting end 282 of the wire 28 extends out from a corresponding enlarged end opening 2468 of the vertical hole 2464. The other end of each wire 28 extends out from a given horizontal hole 2462. The given horizontal holes 2462, along with the portion of the vertical hole extending away from the corresponding enlarged end opening 2468, with a corresponding wire 28 therein may be sealed by an insulating glue/adhesive 54 before the lens module 20 is assembled in the chip package 30. In addition, each wire 28 may, advantageously, be offset from the axis of the vertical hole 2464 so that a pinhead of an injecting glue machine may easily be inserted into the cylindrical end opening 2466 so as to inject each type of glue/adhesive used for sealing respective portions of the vertical hole 2464.

Figure 4:
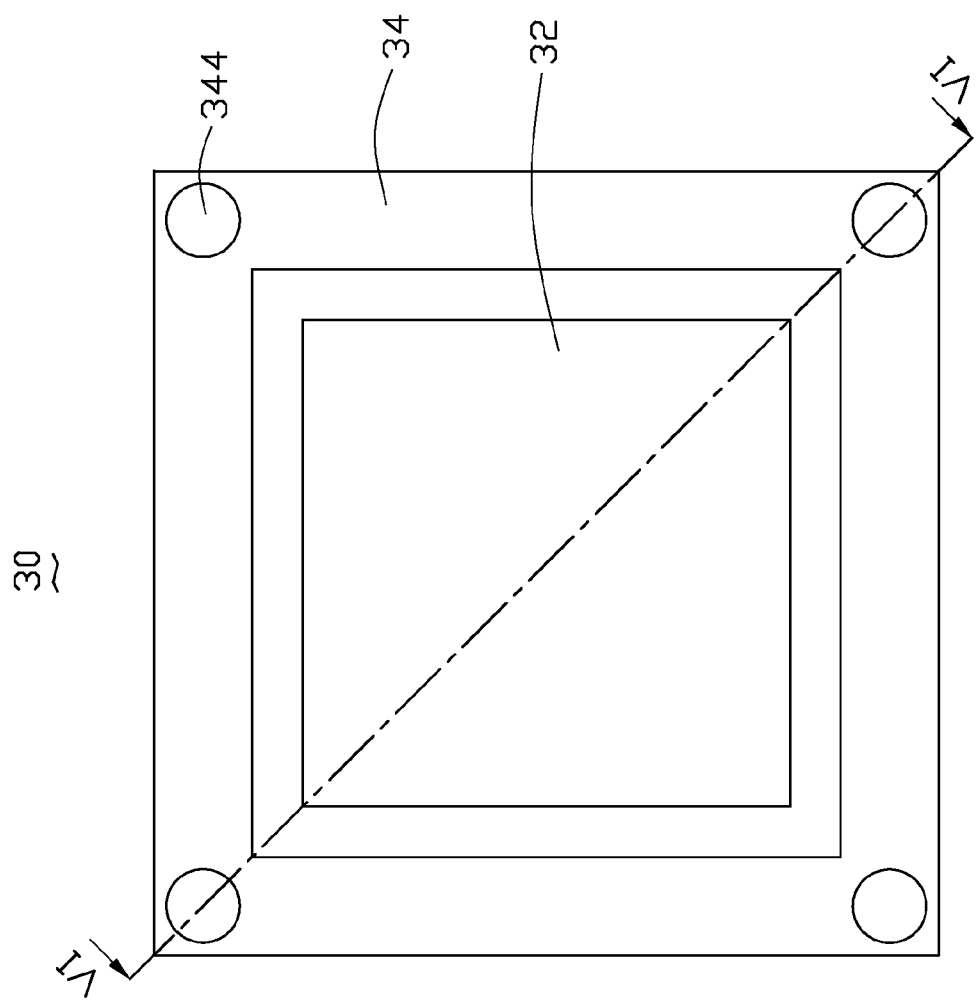
FIG. 4 is a top view of a chip package shown in FIG. 1.
Figure 5:
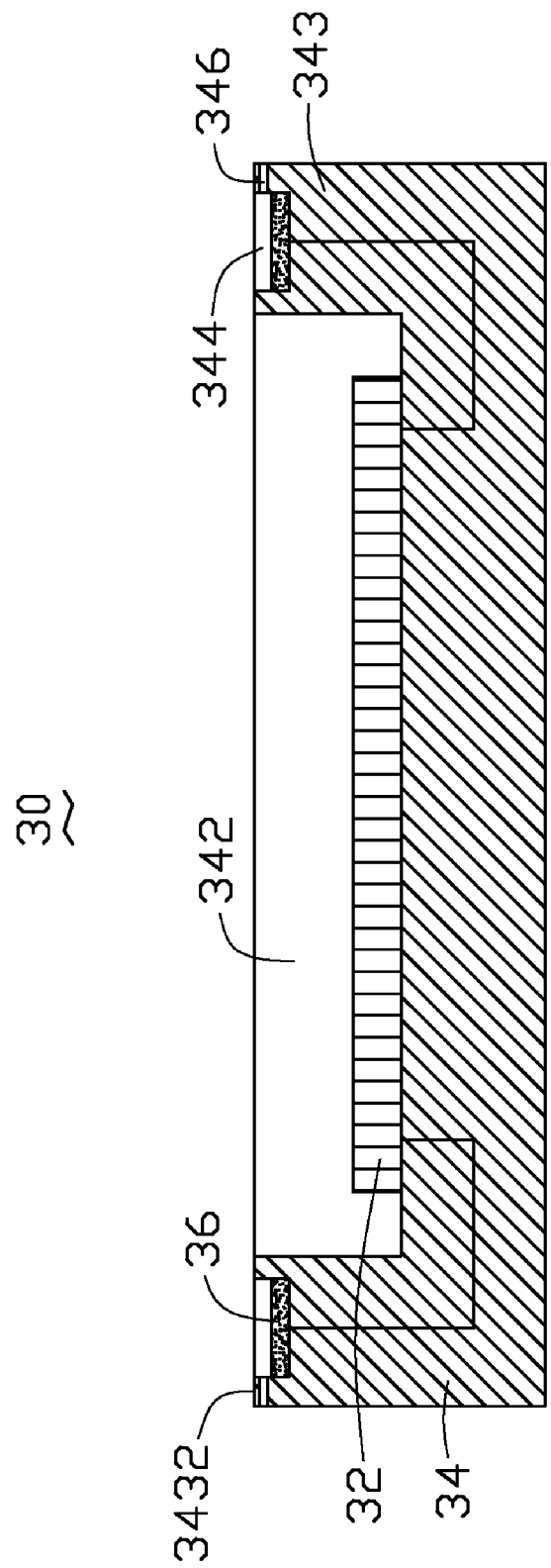
FIG. 5 is a cut-away view of a chip package, taken along the VI-VI line in FIG. 4.

Referring to FIGS. 4-5, the chip package 30 includes a chip module 32 and a base 34. The chip module 32 is mounted on a central area of the base 34 and is configured for transforming light into an electronic signal. The base 34 can be, e.g., a printed circuit board (PCB) or a flexible printed circuit board (FPCB) and be configured for processing the electronic signal. The central area of the base 34 is recessed so as to form a cylindrical cavity 342 configured for receiving the chip module 32 and so as to thereby define a frame portion 343. The frame portion 343 has an annular upper surface 3432. A plurality of grooves/recesses/indents 344 is distinctly and spacedly formed (relative to one another) on the upper surface 3432. An air vent 346 is respectively defined beside a given groove 344 and allows the groove 344 to communicate with the outside (i.e., ambient). A conductive pad 36 is respectively formed by metallurgical means (e.g., metal deposition, solder reflow, etc.) on the bottom surface of a corresponding groove 344. The pads 36 respectively electrically connect with the chip module 32. The pad 36 may, alternatively, be attached to the base 34. Some conductive adhesive 52 is dropped/deposited on each pad 36 so as to electrically connect/couple the pad 36 and a corresponding wire 28 during assembly of the camera module 200. In order to avoid the conductive adhesive 52 separating from the pad 36, the pad 36 may, advantageously, have several holes/grooves (not shown) defined therein to increase the effective surface area of the pad, so that the conductive adhesive 52 may be better attached to the surfaces of the groove 344 accordingly.

The focusing structure 40, which is a driver, such as a motor, is fixed to the holder body 242 in the spaced notch 2424 and connects (i.e., electrically couples) with the wires 28. The chip module 32 can control the focusing structure 40 by means of the wires 28, so that the focusing structure 40 may drive the barrel 22, carrying the lens elements 222, to selectively move either toward or away from the chip module 32. Therefore, the focusing structure 40 may adjust the distance between the lens elements 222 and the chip module 32 to make a clearer image when photographing objects at different distances from the camera module 200.

Figure 6:
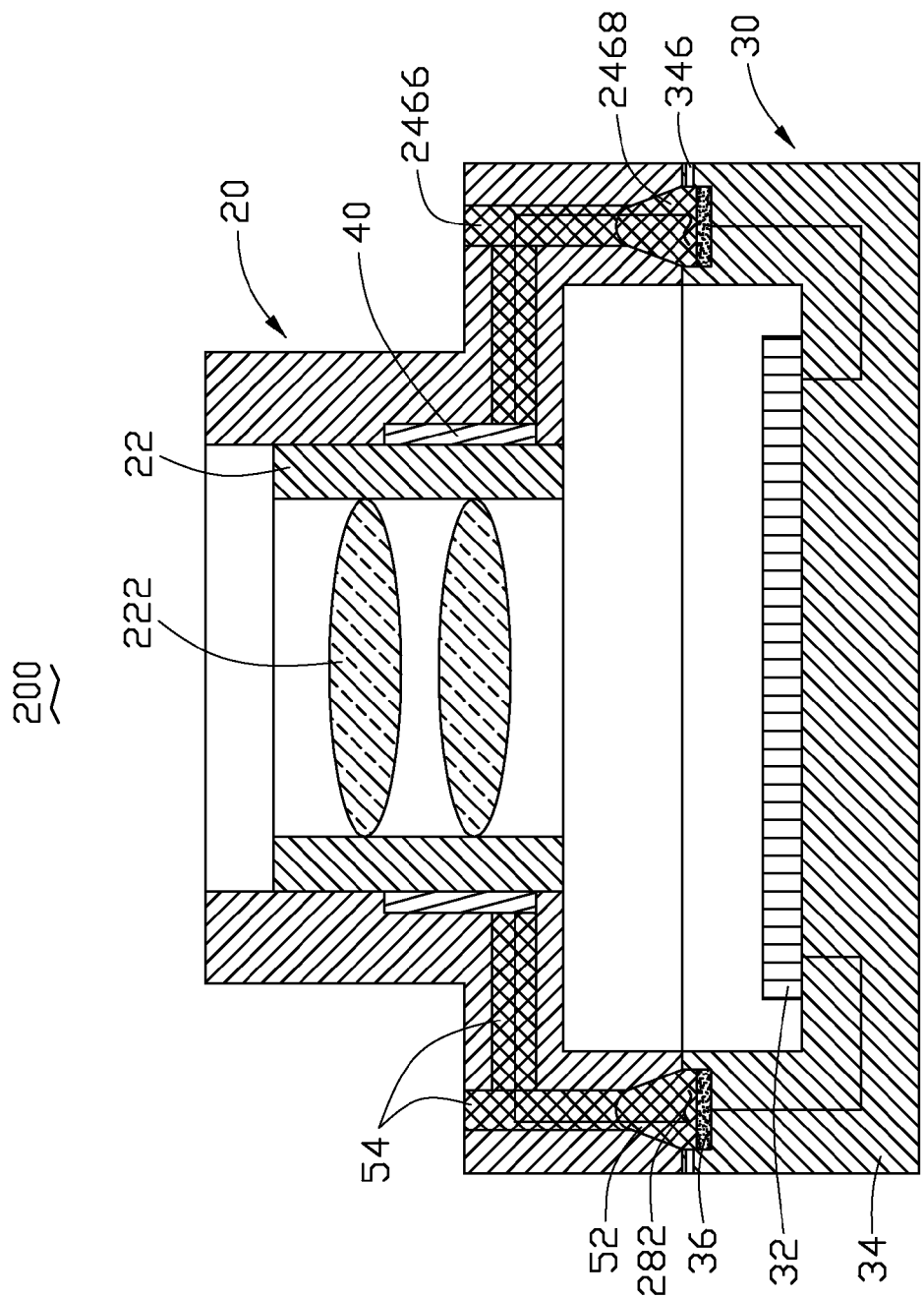
FIG. 6 is similar to FIG. 1, but showing an amount of glue/adhesive received in a given vertical channel of a holder.
Figure 7:
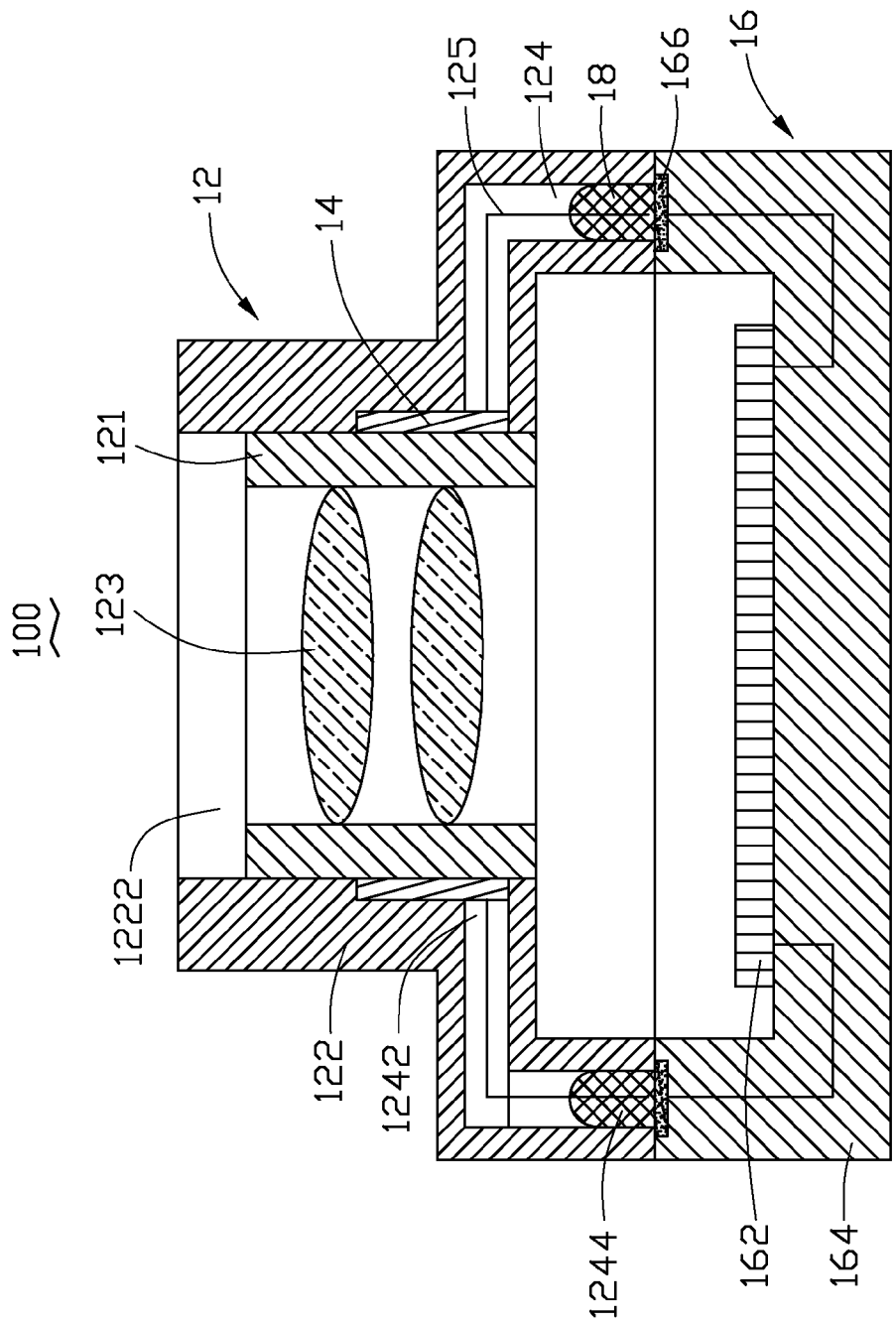
FIG. 7 is a side cut-away view of a typical digital camera module with a focusing structure.
Figure 8:
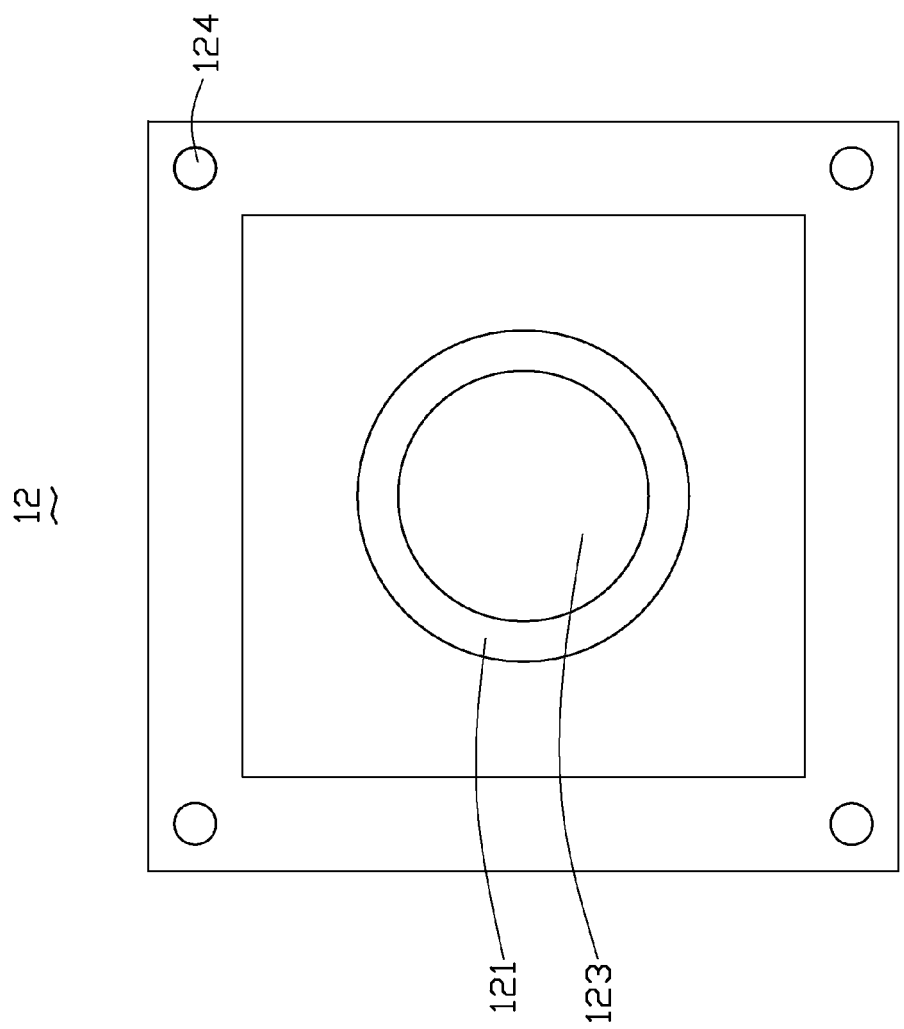
FIG. 8 is a bottom view of a lens module shown in FIG. 7.

Referring to FIG. 6, in assembly of the lens module 20 onto the chip package 30, some liquid conductive adhesive 52 is dropped/deposited on the respective pads 36. The lens module 20 is then placed on the base 34 with the connecting ends 282 of the wires 28 received in a corresponding groove 344. The conductive adhesive 52 in the groove 344 is allowed to flow into the horn-shaped enlarged end opening 2468, and the air in the grooves 344 escapes from a corresponding air vent 346. Finally, some insulating glue/adhesive 54 is dropped/deposited into each channel 246 via a corresponding cylindrical end opening 2466 thereof so as to seal the channel 246 and to otherwise mechanically support a given wire 28 therein. At the same time, the trapped air in the channels 246 escapes from the cylindrical end opening 2466. Accordingly, the assembly of the digital camera module 200 is finished.

A main advantage of the digital camera module 200 is that the enlarged end openings 2468 are designed to be horn-shaped or bell-shaped. Accordingly, the liquid conductive adhesive 52 in the groove 344 of the base 34 may not easily flow into the channel 246 and seldomly escapes from the area proximate a given groove 344 during assembly. Instead, the shape of the enlarged end openings 2468 effectively retains the conductive adhesive 52 in its desired location (i.e., adjacent a given pad 36). In addition, the contact area between the conductive adhesive 52 and the holder 24 is increased (due to the bell shape of the respective enlarged end openings 2468) so as to strengthen the combination (i.e., the bonding therebetween) of the lens module 20 to the chip package 30. Further, each channel 246 has a cylindrical end opening 2466, and an air vent 346 is defined to communicate with the corresponding groove 344 to the outside (i.e., ambient). Therefore, the air in the grooves 344 and the channels 246 may escape from the air vents 346 or the cylindrical end openings 2466 as the adhesives 52, 54 are deposited therein, reducing the opportunity for the occurrence of air pocket formation.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A digital camera module comprising:
a lens module comprising a holder, a barrel slidably received in the holder, and at least one lens element fixed in the barrel, the holder defining a plurality of channels therein, each channel defining an enlarged end opening;
a plurality of wires each received in a corresponding channel;
a focusing structure attached to the holder; and
a chip package comprising a plurality of pads formed on the surface thereof, the positions of the pads corresponding to the enlarged end openings of the channels;
wherein an amount of conductive adhesive is deposited on the pads and retained by the enlarged end openings of the channels, the lens module is attached to the chip package by means of the conductive adhesive, and each wire is electrically coupled to a corresponding pad so that the chip package is thereby configured for controlling the focusing structure to selectably drive movement of the barrel.

2. The digital camera module as claimed in claim 1, wherein the base has a plurality of recesses defined therein, and the pads are respectively received upon a corresponding recess.

3. The digital camera module as claimed in claim 2, wherein a corresponding air vent is defined beside a given recess and communicates the given recess to the ambient.

4. The digital camera module as claimed in claim 1, wherein the holder comprising a holder body and a flange, the flange includes a connecting board and a plurality of sidewalls, and the sidewalls are attached to the base.

5. The digital camera module as claimed in claim 4, wherein each channel respectively includes a horizontal hole and a vertical hole, each respective horizontal hole is defined in the connecting board, each respective vertical hole is defined in a corresponding sidewall and communicate with a corresponding horizontal hole, and each vertical hole extends through a corresponding sidewall and forms the corresponding enlarged end opening of a given channel.

6. The digital camera module as claimed in claim 5, wherein each wire has a connecting end, the connecting end is bent to be approximately perpendicular to the axis of the vertical hole.

7. The digital camera module as claimed in claim 6, wherein the connecting end of each wire is in a shape selected from the group consisting of curve-shaped and hook-shaped.

8. The digital camera module as claimed in claim 1, wherein the enlarged end openings of the channels are bell-shaped.

9. The digital camera module as claimed in claim 1, wherein the chip package comprises a base and a chip module, the chip module is mounted on the base, and the pads electrically connect with the chip module.

10. The digital camera module as claimed in claim 1, wherein each wire is offset from the axis of a corresponding channel.

11. A digital camera module comprising:
a lens module comprising a holder, a barrel slidably received in the holder, and at least one lens element fixed in the barrel, the holder defining a plurality of channels therein, each channel defining an enlarged end opening;
a plurality of wires each received in a corresponding channel;
a focusing structure attached to the holder; and
a chip package comprising a chip module and a base, the chip module mounted on the base, the base defining a plurality of recesses, the chip package further comprising a plurality of pads and defining an air vent respectively communicating a corresponding recess to ambient, each recess receiving a corresponding pad, the pads respectively corresponding to a given channel, each pad electrically coupling with the chip module;
wherein an amount of conductive adhesive is deposited on the pads of the base and retained by the enlarged end openings, the lens module is attached to the chip package by means of the conductive adhesive, each wire respectively electrically couples with a corresponding pad, and the chip module controls the focusing structure to selectably drive a movement of the barrel to move.

12. The digital camera module as claimed in claim 11, wherein the holder comprising a holder body and a flange, the flange comprising a connecting board and a plurality of sidewalls, the sidewalls being attached to the base, each channel comprising a horizontal hole and a vertical hole, each horizontal hole being respectively defined in the connecting board, each vertical hole being respectively defined in a given sidewall and communicating with a corresponding horizontal hole, and each vertical hole extending through a corresponding sidewall and forming the corresponding enlarged end opening, the corresponding enlarged end opening being adjacent a corresponding pad of the base.

13. The digital camera module as claimed in claim 12, wherein each wire comprises a connecting end, the connecting end is bent to be approximately perpendicular to the axis of the vertical hole, and the connecting end of each wire is curve-shaped or hook-shaped.

14. A method for assembling a digital camera module, comprising:

provformatting a lens module, the lens module comprising, a holder, and a barrel slidably received in the holder, and at least one lens element fixed in the barrel, the holder defining a plurality of channels therein, each channel defining an enlarged end opening;

providing a plurality of wires, each wire being received in a corresponding channel;

providing a focusing structure, the focusing structure being fixed in the holder and configured for selectably driving movement of the lens barrel;

providing a chip package, the chip package comprising a chip module, a base, and a plurality of pads, the chip module mounted on the base, the pads being mounted on the base, each pad being respectively electrically coupled with the chip module;

providing a respective amount of conductive adhesive, the conductive adhesive being deposited on a corresponding pad;

placing the lens module on the chip package, each pad being positioned adjacent a corresponding enlarged end opening of a given channel, the conductive adhesive being substantially retained proximately a corresponding pad by the respective enlarged end opening; and attaching the lens module to the chip package upon solidifying each respective amount of the conductive adhesive.

15. The method as claimed in claim 14, wherein each channel comprises a horizontal hole and a vertical hole, each vertical hole defines the enlarged end opening of a given channel, and the method further comprises a insulating adhesive into each vertical hole of a corresponding channel for sealing the channel.

* * * * *